(12) United States Patent
Botosan et al.

(10) Patent No.: US 7,485,062 B2
(45) Date of Patent: Feb. 3, 2009

(54) HYDRAULIC CONTROL SYSTEM WITH VARIABLY REGULATED LINE PRESSURE

(75) Inventors: Valentin Botosan, Rochester, MI (US); Berthold Martin, Shelby Township, MI (US)

(73) Assignee: Chrysler LLC, Auburn Hills, MI (US)

( * ) Notice: Subject to any disclaimer, the term of this patent is extended or adjusted under 35 U.S.C. 154(b) by 245 days.

(21) Appl. No.: 11/363,250

(22) Filed: Feb. 27, 2006

(65) Prior Publication Data

US 2007/0202979 A1    Aug. 30, 2007

(51) Int. Cl.
*F16H 31/00*   (2006.01)
(52) U.S. Cl. .................. 475/127; 475/120; 475/123; 477/163
(58) Field of Classification Search .............. None
See application file for complete search history.

(56) References Cited

U.S. PATENT DOCUMENTS

| | | | | |
|---|---|---|---|---|
| 4,541,308 A | * | 9/1985 | Person et al. | 477/162 |
| 5,460,582 A | * | 10/1995 | Palansky et al. | 477/138 |
| 5,890,509 A | * | 4/1999 | Becker et al. | 137/115.26 |
| 6,471,613 B1 | | 10/2002 | Botosan et al. | |

OTHER PUBLICATIONS

U.S. Appl. No. 10/916,893, filed Aug. 12, 2004, Kanafani et al.

* cited by examiner

*Primary Examiner*—David D. Le
(74) *Attorney, Agent, or Firm*—Ralph E. Smith

(57) ABSTRACT

A hydraulic control system for an automatic transmission includes a planetary gear system having a plurality of clutch elements that alters the torque ratio of the transmission. The hydraulic control system includes a line pressure control device for regulating a variable hydraulic line pressure from a maximum line pressure to a fixed fluid line pressure that is lower than the maximum line pressure when an overdrive clutch is applied in a high gear.

15 Claims, 4 Drawing Sheets

HYDRAULIC CONTROL SYSTEM WITH VARIABLY REGULATED LINE PRESSURE

TECHNICAL FIELD

The present invention relates generally to a hydraulic control system used in an automatic transmission for a vehicle, and more particularly to a pressure control configuration for regulating line pressure in the hydraulic control system.

BACKGROUND

In traditional automatic transmissions, hydraulic fluid line pressure is usually maintained at two different pressure levels while in the "Drive" mode. In first and second gears (i.e. the low gears), the pressure level (e.g., about 135 psi) remains constant. When the transmission shifts to third and fourth gears (i.e. the "high gears"), the pressure level typically lowers (e.g., to about 85 psi).

A known automatic transmission having the ability to vary the line pressure according to an optimal running condition pressure is described, for example, in U.S. Pat. No. 6,471,613 to Botosan et al., which is commonly assigned to the assignee of the present disclosure. The known automatic transmission varies the line pressure and operates at an increased pressure level for a low gear situation in addition to operation at a lower pressure level for a high gear situation. Regardless of the gear situation, the known automatic transmission operates in a default mode at a maximum line pressure level. Accordingly, although maximum line pressure is available for low gears to achieve clutch holding torque capacity for control of the clutches, the maximum line pressure capacity is also made available to clutches (e.g., the overdrive clutch) that operate in a higher gear.

It can be desirable to provide an automatic transmission having a variable line pressure arrangement that limits line pressure when operating in the default mode at a maximum line pressure level. Accordingly, the durability of a clutch, such as, for example, the overdrive clutch, operating under a maximum line pressure in a default mode of a variable line pressure automatic transmission may be improved while also eliminating overloading of an overdrive piston, clutch components, and the like to realize optimum performance in addition to avoiding clutch slip.

SUMMARY

A hydraulic control system for an automatic transmission includes a planetary gear system having a plurality of clutch elements that alters the torque ratio of the transmission. The hydraulic control system includes a line pressure control device for regulating a variable hydraulic line pressure from a maximum line pressure to a fixed fluid line pressure that is lower than the maximum line pressure when an overdrive clutch is applied in a high gear.

BRIEF DESCRIPTION OF THE DRAWINGS

The present invention will become more fully understood from the detailed description and the accompanying drawings, wherein:

FIG. 1a is a table illustrating the applied clutches for each gear ratio of the transmission according to an embodiment of the invention;

DETAILED DESCRIPTION

Figure 1:
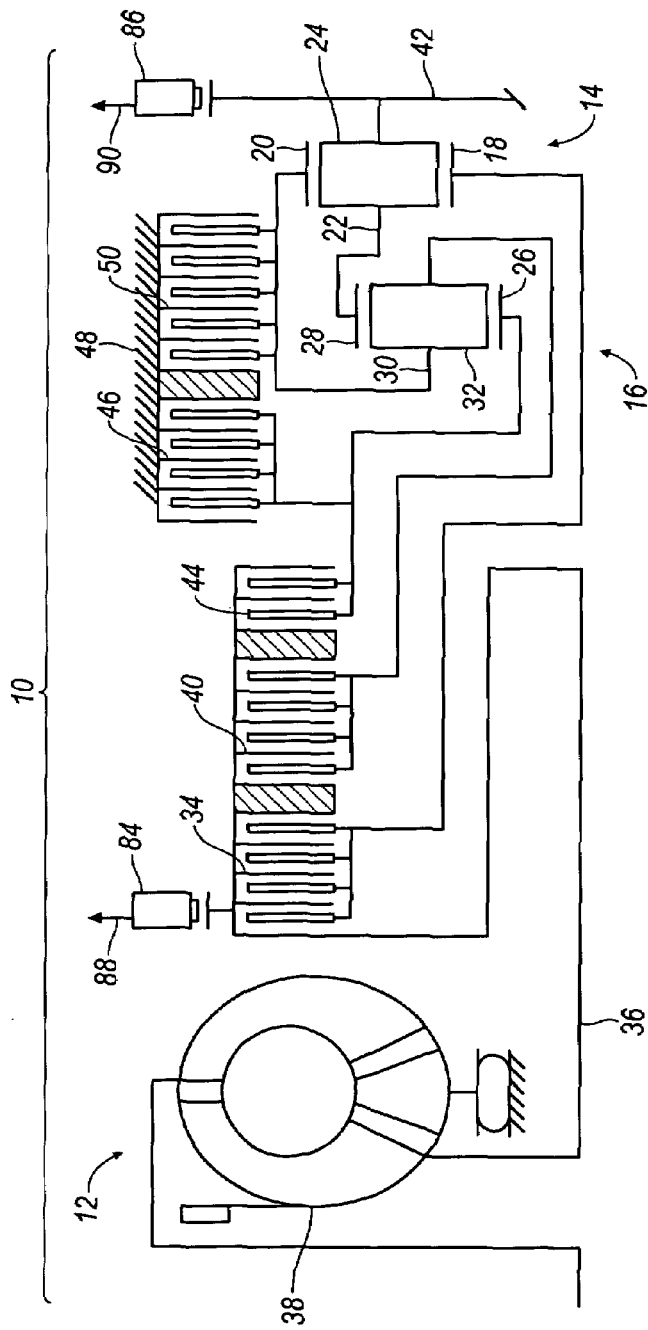
FIG. 1 is a schematic view of the hydraulic control system of the automatic transmission according to an embodiment of the invention.

With reference to FIG. 1, a four-speed automatic transmission 10 is shown, according to an embodiment of the invention. The automatic transmission 10 includes a torque converter 12, which is operatively connected to a multiple planetary gear system. The multiple planetary gear system includes a first planetary gear assembly, which is shown generally at 14, and a second planetary gear assembly, which is shown generally at 16. The first planetary gear assembly 14 includes a sun gear 18, an annulus gear 20, a planetary carrier assembly 22, and a plurality of rotatably mounted planetary gears 24. The second planetary gear assembly 16 includes a sun gear 26, an annulus gear 28, a planetary carrier assembly 30, and a plurality of rotatably mounted planetary gears 32.

The sun gear 18 of the first planetary gear assembly 14 may be selectively driven by engagement of an underdrive clutch 34 with an input shaft 36 that is driven by a turbine 38 of the torque converter 12. The annulus gear 20 of the first planetary gear assembly 14 is attached to the planetary carrier 30 of the second planetary gear assembly 16. Both of these elements can be selectively engaged by an overdrive clutch 40 which engages the annulus gear 20 of first planetary gear assembly 14, and the planetary carrier 30 of the second planetary gear assembly 16 to the input shaft 36. The planetary carrier 22 of the first planetary gear assembly 14 is attached to an output shaft 42 and is also attached to the annulus gear 28 of the second planetary gear assembly 16. A reverse clutch 44 may operably connects the sun gear 26 of the second planetary gear assembly 16 to the input shaft 36. A 2-4 brake clutch 46 may be provided to engage the sun gear 26 of the second planetary gear assembly 16 to the transmission housing 48. In the illustrated embodiment, a low/reverse brake clutch 50 is provided to engage the annulus gear 20 of the first planetary gear assembly 14 and the planetary carrier 30 of the second planetary gear assembly 16 to the housing 48.

FIG. 1A illustrates the different operating modes of the automatic transmission shown in FIG. 1 for an embodiment of the invention. In particular, in order to obtain a reverse gear operation, the reverse clutch 44 and low/reverse brake clutch 50 is applied. In order to provide improved neutral-to-reverse shift quality, the low/reverse brake clutch 50 is applied in neutral. In order to obtain first gear, the underdrive clutch 34 and the low/reverse brake clutch 50 is applied. In order to obtain second gear, the underdrive clutch 34 and the 2-4 brake clutch 46 is applied. In order to obtain direct gear (i.e., the $3^{rd}$ gear), the underdrive clutch 34 and the overdrive clutch 40 is applied. In order to obtain overdrive (i.e., the $4^{th}$ gear), the overdrive clutch 40 and the 2-4 brake clutch 46 is applied.

Figure 2:
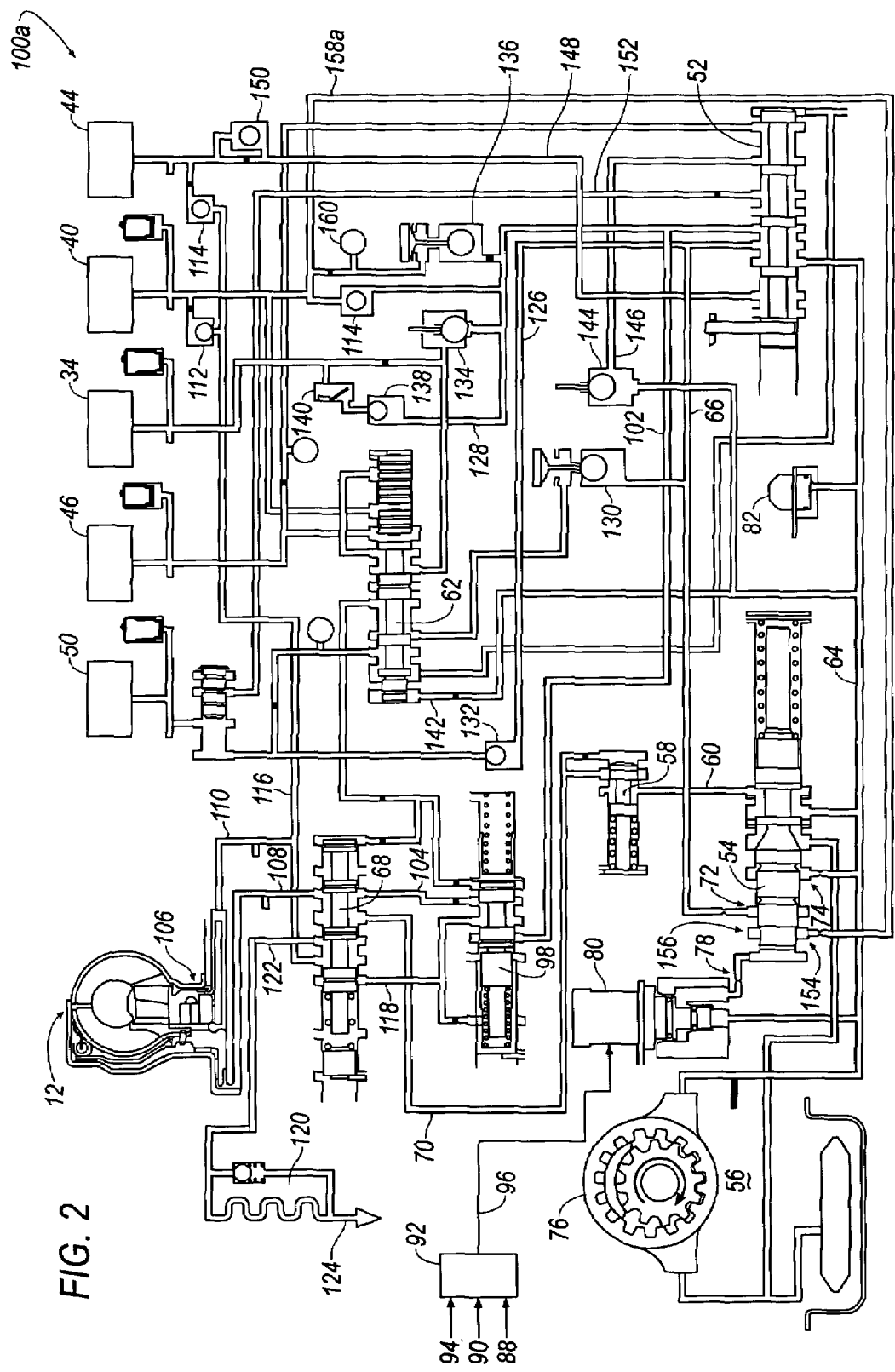
FIG. 2 is a schematic view of the hydraulic control system of the automatic transmission according to an embodiment of the invention.
Figure 3:
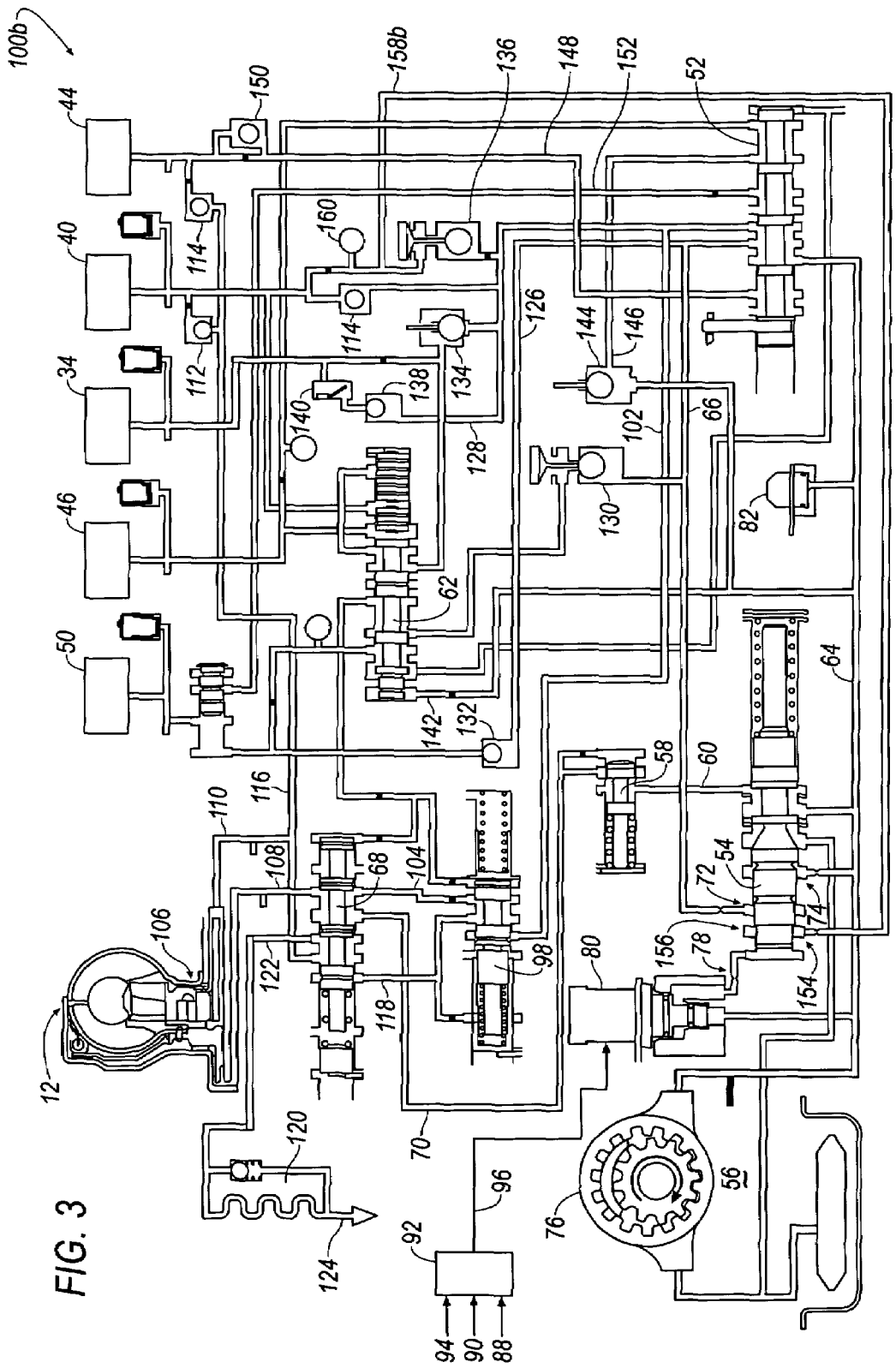
FIG. 3 is a schematic view of the hydraulic control system of the automatic transmission according to an embodiment of the invention.

Turning now to FIGS. 2 and 3, a hydraulic control system according to an embodiment of the invention is shown (generally at 100a and 100b, respectively) for controlling the operation of transmission 10. When a manual valve, shown generally at 52, is in the drive "D" position, a regulator valve 54 distributes hydraulic fluid 56 under pressure to a torque converter limit valve 58 via a fluid passage, shown generally at 60. Fluid is also open to a solenoid switch valve, shown generally at 62, and to the manual valve 52 via passages, which are shown generally at 64 and 66, respectively. The torque converter limit valve 58 communicates fluid to a torque converter switch valve 68 via a passage, shown generally at 70.

The regulator valve 54 may include a first or manual valve fluid port 72 communicating with the manual valve 52 via the passage 66, a second or pump fluid port 74 communicating with a hydraulic fluid pump 76, and a third or solenoid influenced fluid port 78 influenced by a variable force solenoid 80 communicating with the hydraulic fluid pump 76 and the manual valve 52 via the passage 64. A pressure transducer 82 can monitor and measure the pressure at all times. The variable force solenoid 80 may be actuated to establish the desired line pressure for optimum running conditions and is based on the information obtained at the input shaft 36 and output shaft 42 by an input speed sensor 84 (see e.g., FIG. 1) and output speed sensor 86, respectively. Respective signals 88, 90 from speed sensors 84, 86 are received by a powertrain control module 92.

The powertrain control module 92 uses the information along with a signal 94 obtained from the engine regarding throttle angle and torque to generate and send a signal 96 to the variable force solenoid 80. The variable force solenoid 80 maintains the appropriate fluid pressure at the end of the regulator valve 54 to vary supply line pressure at an optimal level according to the given situation. For example, when the vehicle is under minimal loading conditions, it is desirable to run the transmission at a reduced line pressure; as such, based on the optimum desired line pressure, the variable force solenoid 80 is energized and signal pressure is supplied to the regulator valve 54 at the third fluid port 78, which results in the reduction of line pressure. Similarly, when the vehicle is under a high loading condition, the transmission could undergo clutch slip realized through speed sensors 84, 86; in this situation, the variable force solenoid 80 would not provide any signal pressure at the third fluid port 78, which provides an increased line pressure.

In an embodiment, pressurized fluid is delivered to a torque converter control valve 98 via a passage, which is shown generally at 102. The torque converter control valve 98 communicates pressurized fluid to the torque converter switch valve 68 via a hydraulic passage, which is shown generally at 104. The torque converter switch valve 68 communicates pressurized fluid to a torque converter clutch 106 via a passage, shown generally at 108. Hydraulic fluid is also communicated between the torque converter clutch 106 and the torque converter switch valve 68 via a passage, shown generally at 110. Fluid is also communicated from torque converter switch valve 68 to ball check valves 112, 114 through a passage, shown generally at 116. As illustrated, ball check valves 112, 114 allow fluid to flow to overdrive clutch 40 and reverse clutch 44.

In an embodiment, hydraulic fluid is communicated between the torque converter control valve 98 and the torque converter switch valve 68 via a passage, which is shown generally at 118. Hydraulic fluid is communicated between the torque converter switch valve 68 and a cooler device 120 via a passage, shown generally at 122. The hydraulic fluid from the cooler device 120 is communicated back to the pump 76 via a passage, which is shown generally at 124.

Hydraulic fluid is delivered to the passages 64, 66, 102, 126, and 128 from manual valve 52. Passage 66 communicates the regulator valve 54 to the manual valve 52. Passage 126 communicates fluid to a normally closed solenoid 130 and ball check valve 132. Passage 102 communicates fluid to converter clutch control valve 98 while passage 128 transmits fluid through a normally open solenoid 134 that returns fluid to the solenoid switch valve 62 as well as communicates fluid to the underdrive clutch 34. Passage 128 also allows fluid to flow through a normally closed solenoid 136 to overdrive clutch 40. In addition, a passage 128 delivers fluid through the ball check valve 138 and a temperature controller 140 to underdrive clutch 34.

To obtain reverse gear, in an embodiment, the reverse clutch 44 and the low/reverse brake clutch 50 must be applied. The regulator valve 54 distributes hydraulic fluid under pressure to the torque converter limit valve 58 via the fluid passage 60. Fluid is also open to the second fluid port 74, which communicates with the pump 76 and the manual valve 52 via the passage 64. The variable force solenoid 80 is closed, preventing fluid from flowing through the third fluid port 78. Fluid also communicates with the solenoid switch valve 62 via a passage, which is shown generally at 142. The passage 142 allows fluid to travel past a ball check valve 144 through passage 146 and to the manual valve 52. Fluid travels from the manual valve 52 through a passage, shown generally at 148, communicating with open ball check valve 150, to apply reverse clutch 44. Fluid also travels through passage 152 from the manual valve 52 to apply the low/reverse brake clutch 50.

Referring to FIGS. 2 and 3, in addition to the first, second, and third fluid ports 72, 74, 78, an embodiment of the regulator valve 54 includes a fourth fluid port, which is shown generally at 154. In operation, the fourth fluid port 154 can provide a means for regulating a variable hydraulic line pressure (e.g. between about 39-165 psi) from a maximum line pressure to a fixed fluid line pressure that is lower than the maximum line pressure when an overdrive clutch is applied in a high gear situation. As used herein, "maximum line pressure" is the pressure run in default mode when the system is running at very high pressure. Accordingly, the regulator valve 54 may permit calibration for a desired potentially lower, fixed line pressure (e.g. between about 90-100 psi) when, for example, the overdrive clutch 40 is applied in a higher gear (e.g., $3^{rd}$ or $4^{th}$ gear) situation. The lower fixed line pressure is used to operate the overdrive clutch when the transmission 10 operates in an open-loop under maximum line pressure of about 165 psi when in a lower gear (e.g. $1^{st}$ or $2^{nd}$ gear). As such, the fourth fluid port 154 may also be referred to as a fixed fluid line pressure port 154.

As generally shown in the illustrated embodiment, the fourth fluid port 154 may communicate with the overdrive clutch 40 over a passage, shown generally at 158a (e.g., FIG. 2), or, a passage, which is shown generally at 158b (e.g., FIG. 3). Referring to FIG. 2, the fluid passage 158a, 158b is in line pressure communication between the overdrive clutch 40 and overdrive solenoid 136, before a pressure switch 160. Alternatively, referring to FIG. 3, the fluid passage 158a, 158b is in line pressure communication between the overdrive clutch 40 and overdrive solenoid 136, after the pressure switch 160. Functionally, when the overdrive solenoid 136 is cycled, pressure is applied to the overdrive clutch 40; accordingly, a lower, fixed fluid line pressure is applied in the passage 158a, 158b, which is fed back into the regulator valve 54 at the fourth fluid port 154.

When the overdrive solenoid 136 is cycled, the fluid line passage 158a, 158b is pressurized and the pressure switch 160 is closed; conversely, the pressure switch 160 opens in response to a lack fluid pressure in the fluid line passage 158a, 158b. Although the location of the passage 158a, 158b is shown before or after the pressure switch 160 in FIGS. 2 and 3, it will be appreciated that the function of the regulator valve 54 at the fourth fluid port 154 is not effected in view of the location fluid line passage 158a, 158b relative the location of the pressure switch 160; rather, functional operation of the regulator valve 54 is determined by the location of the passage 158a, 158b relative the overdrive solenoid 136.

Accordingly, through the addition of the fourth fluid port 154 between the first fluid port 72 and the third fluid port 78, a larger differential area can be realized in the regulator valve 54, resulting in a lower, fixed fluid line pressure in fluid line passages 158a, 158b. Therefore, in a higher gear situation, pressure in a fluid line passage 158a, 158b can be lowered to a desirable operational pressure from, for example, 165 psi, to a lower pressure level, for example, between about 90-100 psi, when the overdrive clutch 40 is applied. As a result, pressure may be limited on the overdrive clutch 40. Additionally, overloading of an overdrive piston, clutch components, and the like can be eliminated, potentially increasing the durability of the overdrive clutch 40. Even further, the desired varying of the lower line pressure in passage 158a, 158b helps avoid clutch slip and permits improved performance of the automatic transmission 10.

Figure 4:
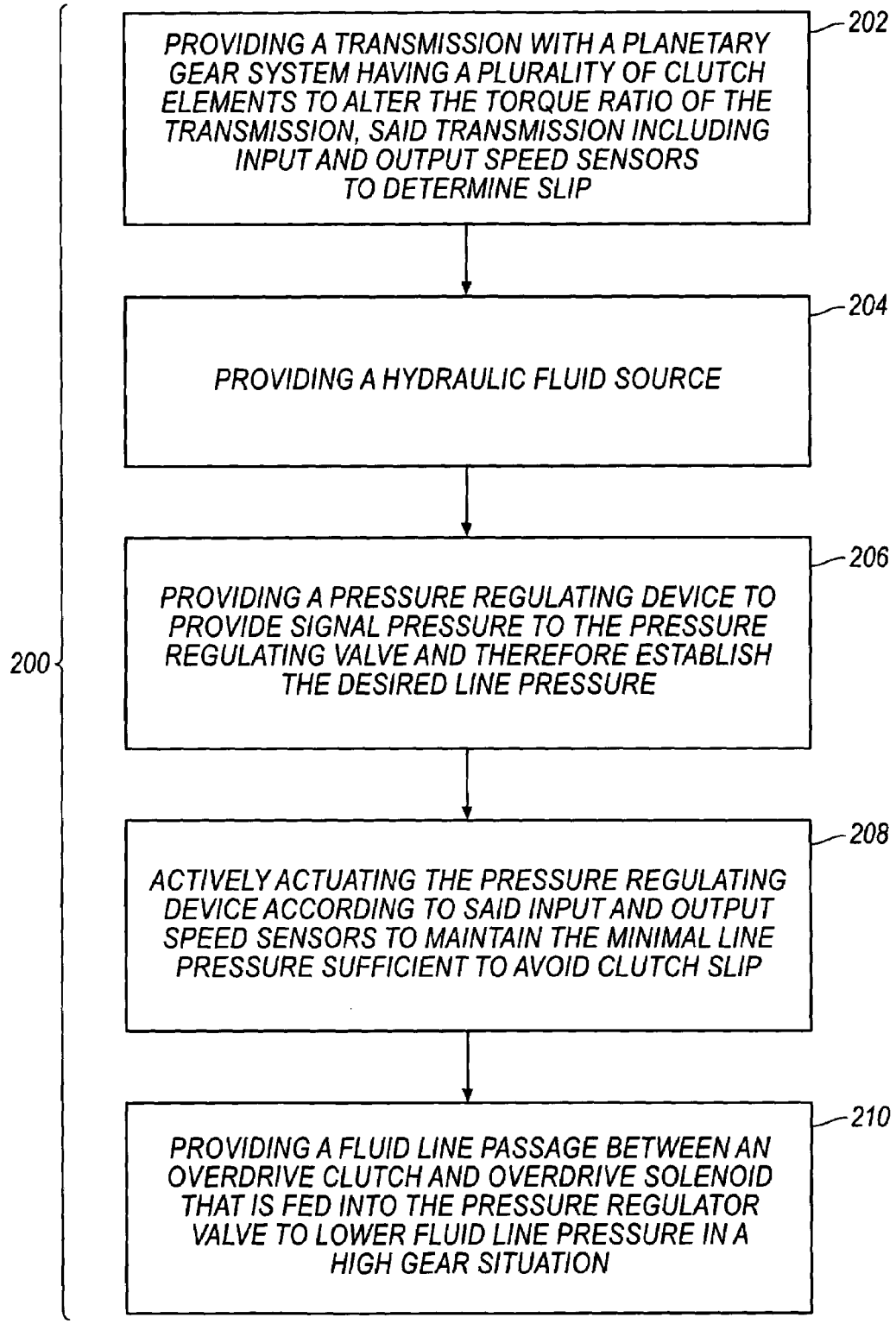
FIG. 4 is an outline of general steps of a method according to an embodiment of the invention.

Referring now to FIG. 4, in a first general step 202, a method 200 of the present disclosure provides a transmission 10 with a planetary gear system 14, 16 having a plurality of clutch elements to alter the torque ratio of the transmission, the transmission including input and output speed sensors 84, 86. In a second general step 204, the method 200 provides a hydraulic fluid source 56. In a third general step 206, the method 200 provides a pressure regulating device 80 to supply signal pressure at the pressure regulating valve 54. In a fourth general step 208, the pressure regulating device 80 is actively actuated to attain and maintain the minimal line pressure sufficient to avoid clutch slip. In a fifth general step 210, the fluid line passage 158a, 158b is positioned in line pressure communication between the overdrive clutch 40 and overdrive solenoid 136. The fluid line passage 158a, 158b is fed into the pressure regulating valve 54 to provide a larger differential area in the regulator valve 54. As a result, a pressure lower than the maximum line pressure may be provided by the fluid line passage 158a, 158b when the overdrive clutch 40 is applied in a high gear situation. The first through fifth steps 202-210 can operate in a variable line pressure automatic transmission.

The present invention has been particularly shown and described with reference to the foregoing embodiments, which are merely illustrative of the best mode or modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A hydraulic control system for an automatic transmission including a planetary gear system having a plurality of clutch elements to alter the torque ratio of the transmission, said hydraulic control system comprising:
a line pressure control device for providing a variable hydraulic line pressure to the automatic transmission, wherein the line pressure control device further comprises a fluid port for changing the control of the hydraulic line pressure from the variable to a fixed line pressure when an overdrive clutch is applied in a high gear.

2. The hydraulic control system according to claim 1, wherein said variable hydraulic line pressure ranges between about 39 and about 165 psi, and a maximum line pressure is about 165 psi.

3. The hydraulic control system according to claim 1, wherein said fixed fluid line pressure ranges between about 90 and about 100 psi.

4. The hydraulic control system according to claim 1 further comprising
a hydraulic fluid pump; and
a hydraulic fluid source, wherein said variable hydraulic line pressure is supplied from said fluid source to line pressure, said line pressure control device includes a line pressure regulating valve and a solenoid for actuating said line pressure regulating valve, said line pressure regulating valve includes a fixed fluid line pressure port communicating with the overdrive clutch for providing the fixed fluid line pressure to the line pressure regulating valve.

5. The hydraulic control system according to claim 4, wherein the fixed fluid pressure port provides fixed fluid line pressure communication to and from the line pressure regulating valve and overdrive clutch over a fluid line passage between the overdrive clutch and overdrive solenoid.

6. The hydraulic control system according to claim 4, wherein said line pressure regulating valve includes a pump fluid port communicating with a hydraulic fluid pump.

7. The hydraulic control system according to claim 4 further comprising a manual valve selectively movable between a plurality of positions and communicating with said hydraulic fluid source.

8. The hydraulic control system according to claim 7, wherein said line pressure regulating valve includes a manual valve fluid port communicating with said manual valve.

9. The hydraulic control system according to claim 8, wherein said line pressure regulating valve includes a solenoid influenced fluid port communicating with said hydraulic fluid pump and said solenoid.

10. The hydraulic control system according to claim 9, wherein said fixed fluid line pressure port obtains a signal pressure flow at a front end differential area of the line pressure regulating valve between the manual valve fluid port and the solenoid influenced fluid port.

11. A hydraulic control system for an automatic transmission including a planetary gear system having a plurality of clutch elements to alter the torque ratio of the transmission, said hydraulic control system comprising:
a line pressure control device for providing a variable hydraulic line pressure to the automatic transmission, wherein the line pressure control device further comprises a fluid port for changing the control of the hydraulic line pressure from the variable to a fixed line pressure when an overdrive clutch is applied in a high gear;
a hydraulic fluid pump;
a hydraulic fluid source, wherein said variable hydraulic line pressure is supplied from said fluid source to line pressure, said line pressure control device includes a line pressure regulating valve and a solenoid for actuating said pressure regulating valve, and said line pressure regulating valve includes a fixed fluid line pressure port communicating with the overdrive clutch for providing the fixed fluid line pressure to the line pressure regulating valve; and a manual valve selectively movable between a plurality of positions and communicating with said hydraulic fluid source; wherein said line pressure regulating valve includes a manual valve fluid port communicating with said manual valve, said line pressure regulating valve includes a solenoid influenced fluid port communicating with said hydraulic fluid pump and said solenoid, and said line pressure regulating valve includes a pump fluid port communicating with said hydraulic fluid pump.

12. The hydraulic control system according to claim 11, wherein said variable hydraulic line pressure ranges between about 39 psi and about 165 psi, and a maximum line pressure is about 165 psi.

13. The hydraulic control system according to claim 11, wherein said fixed fluid line pressure ranges between about 90 and about 100 psi.

14. The hydraulic control system according to claim 11, wherein the fixed fluid pressure port provides fixed fluid line pressure communication to and from the line pressure regulating valve and overdrive clutch over a fluid line passage between the overdrive clutch and overdrive solenoid.

15. The hydraulic control system according to claim 11, wherein said fixed fluid line pressure port obtains a signal pressure flow at a front end differential area of the regulator valve between the manual valve fluid port and the solenoid influenced fluid port.

* * * * *